United States Patent Office 3,720,728
Patented Mar. 13, 1973

3,720,728
JET FUEL PARAFFIN PRODUCTION
Ernest L. Pollitzer, Skokie, Ill., assignor to Universal Oil Products Company, Des Plaines, Ill.
No Drawing. Continuation-in-part of application Ser. No. 809,001, Mar. 20, 1969, which is a continuation-in-part of abandoned application Ser. No. 723,886, Apr. 24, 1968. This application Mar. 11, 1971, Ser. No. 123,476
Int. Cl. C07c 5/10, 9/00; C10g 13/02
U.S. Cl. 260—676 R
9 Claims

ABSTRACT OF THE DISCLOSURE

Jet fuel paraffinic hydrocarbons are produced from cyclic hydrocarbons, either cycloparaffinic, or aromatic, or mixtures thereof. The process involves hydrogenative cracking, or ring-opening hydrogenation, in contact with a catalyst containing a Group VII-B metal component. The paraffinic product is rich in normal paraffins, and is well-suited for use as a jet fuel blending component.

RELATED APPLICATIONS

The present application is a continuation-in-part of my copending application, Ser. No. 809,001, filed Mar. 20, 1969, which, in turn, is a continuation-in-part of my copending application, Ser. No. 723,886, filed Apr. 24, 1968, both now abandoned. It is intended that all the teachings of said copending applications be incorporated herein by specific reference thereto.

APPLICABILITY OF INVENTION

The present invention provides a process for the conversion of cyclic hydrocarbons into paraffinic hydrocarbons through the utilization of particular conditions of operation, and a particular catalytic composite. Advantages are afforded the production of jet fuel hydrocarbon fractions, through the utilization of a Group VII-B metal component, a platinum-group metallic component, a porous carrier material and combined chlorine.

The quality of a jet fuel fraction is determined by a number of different criteria, among which are the luminosity number and the heating value. At the present time, an important factor is the luminosity number, being that characteristic of jet fuel which is related to the molecular structure of the hydrocarbons present therein; a low luminosity number indicates an excessively luminous flame which is highly undesirable. The luminosity number is dependent to some extent upon the hydrogen to carbon ratio of the mixture; low hydrogen to carbon ratios are unfavorable in view of a corresponding low luminosity number. Aromatic hydrocarbons are thus the poorest components of jet fuels, and, as the number of condensed rings is increased, the fuel is even poorer. Thus, based upon hydrocarbon to carbon ratios only, paraffinic hydrocarbons make the best jet fuel, naphthenes and olefins are next in quality, and aromatics tend to be extremely detrimental. Furthermore, the less-branched hydrocarbons indicate a better luminosity number than the more highly branched hydrocarbons. The latter results, possibly, from low hydrogen to hydrocarbon ratios in local areas of the molecule; thus, normal paraffins appear to be slightly better, in regard to luminosity numbers, than branched-chain paraffins. It is therefore, readily apparent that a jet fuel, or jet fuel components, of high luminosity number must consist principally of normal and slightly-branched paraffins. The desired reaction, as hereinabove set forth, is where naphthenic and aromatic rings are broken, and simultaneously hydrogenated to produce a paraffinic material.

Since many hydrocarbon fractions and/or hydrocarbon distillates contain a significant quantity of aromatic hydrocarbons, such as benzene, toluene and xylene, it is desirable to effect the hydrogenation thereof to form cycloparaffinic hydrocarbons, followed by the virtually simultaneous ring-opening of the cyclo-paraffinic hydrocarbons. This is contrary to the prior understanding of the catalytic reforming process; rather than effect the dehydrogenation of naphthenes, and/or the dehydrocyclization of paraffins to aromatics, both of which reactions are hydrogen-producing, as taught in the prior art, the operating conditions and catalytic composite utilized in the present process effect the conversion of aromatic and naphthentic hydrocarbons to form paraffinic hydrocarbons, a hydrogen-consuming reaction.

The ring-opening reactions are effected in competition with other reactions wherein the paraffins, either formed or present within the feed, undergo a normal hydrocracking reaction to produce lower-boiling hydrocarbons, such as methane, ethane, propane and butane. Hydrocracking reactions of this nature are undesirable in that the ultimate yield of acceptable jet fuel components is substantially reduced.

In the present specification and appended claims, it is intended to distinguish from prior art hydrocracking, which is generally accepted as referring to the conversion of hydrocarbonaceous charge stocks into lower-boiling hydrocarbon products, through the use of the term "hydrogenative cracking," or "ring-opening hydrogenation." Whereas hydrocracking inherently results in substantial quantities of normally gaseous paraffins, methane, ethane and propane, the ring-opening hydrogenation process of the present invention is effected with relatively negligible loss to lower-boiling material, and especially to normally gaseous components.

OBJECTS

One object of my invention is to provide a hydrocarbon conversion catalyst having superior performance characteristics when utilized in a hydrocarbon conversion process. A corollary objective is to afford a catalyst for use in preparing paraffinic jet fuel components.

Another object of my invention is directed toward providing a process for producing jet fuel components rich in paraffin content. In conjunction, my purpose is to produce high yields of jet fuel paraffins without experiencing a significant loss to light, normally gaseous hydrocarbons and normally liquid hydrocarbons outside the generally accepted jet fuel boiling range.

EMBODIMENTS

In one of its broad embodiments, my invention encompasses a process for converting cyclic hydrocarbons into parafinic hydrocarbons, which process comprises contacting hydrogen and cyclic hydrocarbons with a catalytic composite containing a Group VII-B metal component, having an atomic number greater than 25, and combined chlorine, at reaction conditions, separating the resulting reaction products to provide a hydrogen-rich vaporous phase and to recover normally liquid paraffinic hydrocarbons.

A more limited embodiment involves a process for producing jet fuel components from cyclic hydrocarbons which comprises contacting cyclic hydrocarbons and hydrogen, at reaction conditions including a catalyst temperature of from 300° C. to about 500° C. and a pressure of 1,000 to about 5,000 p.s.i.g., with a catalytic composite comprising a porous carrier material, from 0.01% to about 2.0% by weight of a Group VIII noble metal component, from 0.01% to about 2.0% by weight of a Group VII-B metal component, having an atomic number greater than 25, and from 0.1% to about 1.5% by weight of a chlorine component, calculated as the elements, and separating the resulting reaction products to provide a hydrogen-rich vaporous phase and to recover normally liquid paraffinic hydrocarbons. The reaction conditions are correlated to effect, as the principal reaction of the process, the ring-opening and hydrogenation of the cyclic hydrocarbons, without substantial hydrocracking to lower-boiling hydrocarbon products.

Other objects and embodiments relate to the particulars respecting preferred catalytic ingredients, concentration of components in the catalyst, suitable methods of catalyst preparation, operating conditions, etc. These are hereinafter presented in the following, more detailed description of my invention.

PRIOR ART

Recent developments in petroleum refining technology have indicated that the performance characteristics of a Group VIII noble metal catalyst can be enhanced through the incorporation of a Group VII–B metal component. In particular, those Group VII–B metals having an atomic number greater than 25, especially rhenium, have been shown to have a pronounced beneficial effect with respect to catalyst stability, being the ability to maintain activity and selectivity for an extended period of time.

Exemplary of such developments is that described in U.S. Pat. No. 3,415,737, which is directed toward the catalytic reforming of naphtha fractions for the purpose of improving the anti-knock characteristics thereof. As is well-known in this area of the art, catalytic reforming is effected primarily to promote the dehydrogenation of naphthenes to aromatics and the dehydrocyclization of paraffins to aromatics. The isomerization of normal paraffins into isoparaffins constitutes another desirable reforming reaction. In catalytic reforming, however, voluminous quantities of hydrogen are produced, in contrast to the present hydrogen-consuming process, as a result of which catalytic reforming has become a basic refining tool as the source of hydrogen. Reforming catalysts have long been known to possess enhanced characteristics when promoted by the addition of halides, which are considered interchangeable for this purpose. Chlorine and/or fluorine are especially considered for this purpose. However, respecting ring-opening hydrogenation, the use of chlorine significantly improves the stability and selectivity, especially in regard to the quantity of normally gaseous material co-produced. That is, the use of chlorine reduces the degree to which undesirable hydrocracking takes place.

Similarly, U.S. Pat. No. 3,471,412 proposes an aromatization catalyst of a crystalline aluminosilicate promoted by Group VI–A components, sulfur, selenium and tellurium. Disclosed is the co-joint use of metal components from Groups I–A to V–A, I–B to VII–B and VIII. However, it will be recognized that aromatization is a hydrogen-producing process, and is the antithesis of ring-opening hydrogenation.

U.S. Pat. 3,422,001 involves the concept pre-treating a hydrogenation catalyst, in which the metal components exist as sulfides, with hydrogen chloride. This catalyst preparation technique is alleged to improve the hydrogenation activity while simultaneously inhibiting cracking reactions. The resulting catalytic composite is, therefore, incapable of effecting the ring-opening of cyclic hydrocarbons, which reaction is selectively promoted by the catalyst described herein.

Other literature references include Rhenium, Corrigan et al., Cleveland Refractory Metals, 1965, page 20, wherein the production of diesel fuel by hydrocracking a vacuum distillate is discussed. Broad reference is made to the use of one or more metals from the group of tungsten, nickel, platinum, rhenium and molybdenum. Significantly, the hydrocracking into lower-boiling hydrocarbons is enhanced when the metals are composited with a fluorided carrier, and especially one which had been treated with hydrogen fluoride. In like manner U.S. Pat. No. 3,410,787 discloses a fluorided composite for use in a hydrocracking process to produce spray oils boiling above 525° F.—e.g. 650° F. to 700° F. It is quite evident that the intent here is to enhance the cracking propensity of the catalytic composite through the use of a fluorine component.

In short, the available prior art does not recognize the advantages afforded ring-opening hydrogenation with the particular catalyst encompassed by the present invention.

SUMMARY OF INVENTION

The present invention involves the use of a catalytic composite which has an exceptional activity and selectivity, as well as resistance to deactivation, in hydrocarbon conversion processes that require a catalyst having a hydrogenation-dehydrogenation function coupled with a cracking function. Catalysts having a hydrogenation-dehydrogenation function and a cracking function are widely used in many industries, for the purpose of promoting a wide spectrum of hydrocarbon conversion reactions. Generally, the cracking function is thought to be associated with an acid-acting carrier material of a porous, adsorptive, refractory oxide type which is utilized as the support for a heavy metal component, generally the metals or compounds of metals of Groups V through VIII of the Periodic Table to which the hydrogenation-dehydrogenation function is attributed.

Such catalytic composites are known to be useful in promoting a wide variety of hydrocarbon conversion reactions such as hydrocracking, dehydrogenation, isomerization, hydrogenation, desulfurization, cyclization, alkylation, polymerization, cracking, hydroisomerization, etc. In many cases, the commercial application of these catalysts resides in processes where more than one of these reactions proceed simultaneously. An example of this type of process is, as previously set forth, reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins, etc., to produce an octane-rich or aromatic-rich product stream. Another example is a hydrocracking process wherein catalysts of this type are utilized to effect selective hydrogenation and cracking of high molecular weight materials, to produce a generally lower-boiling, more valuable output stream.

Regardless of the reaction, or the particular process involved, it is important that the dual-function catalyst exhibit the capability to perform its specified functions initially, and have the capability to perform them satisfactorily for prolonged periods of time. As is well-known to those skilled in the art, the principal cause of observed deactivation or instability of these dual-function catalysts, particularly in hydrogen-consuming service, is associated with the fact that coke forms on the surface of the catalyst during the course of the reaction. The conditions utilized typically result in the formation of heavy, high molecular weight, black solid or semi-solid, hydrogen-poor carbonaceous material which coats the surface of the catalyst, reducing its activity by shielding its active sites from the reactants. Accordingly, the major problem facing workers in this area of the art is the development of more active and selective catalytic composites that are not as sensitive to the presence of these carbonaceous materials and/or have the capability to suppress the rate of the formation thereof. Similarly, there is the ever-present problem of developing "tailor-made" catalysts, having superior activity, selectivity and stability when intended to have more limited functions, such as converting cyclic hydrocarbons to paraffins without an attendant high yield loss to normally gaseous hydrocarbons and without resulting in a substantially unsaturated product.

I have now found a dual-function catalytic composite which possesses improved activity, selectivity and stability when it is employed in a process for the conversion of hydrocarbons of the type which have heretofore utilized dual-function catalytic composites, and which finds exceptional utility in effecting the ring-opening of cyclic hydrocarbons. Moreover, in the particular case to which the present invention is directed, I have observed that the use of this catalyst results in a substantially saturated product rich in normal paraffinic hydrocarbons.

The catalyst of the present invention comprises a porous carrier material having combined therewith a rhenium component or technetium component and a chlorine component; a preferred catalyst also contains a Group VIII noble metal component. Considering first the carrier utilized in the catalyst, it is preferred that the material be a porous, adsorptive, high surface area support having a surface area of about 25 to about 500 or more m.$^2$/gm. Suitable materials are the crystalline aluminas known as gamma-, eta-, and theta-alumina, with gamma-alumina giving best results. Additionally, in some embodiments, the support may contain minor proportions of other well-known refractory inorganic oxides such as silica, zirconia, magnesia, etc., and may be characterized as amorphous or zeolitic, the latter including mordenite, faujasite, Type A or Type U molecular sieves, etc. However, the preferred support is substantially pure gamma-alumina, or faujasite which is dispersed in an amorphous matrix. An especially preferred support has an apparent bulk density of about 0.30 gm./cc. to about 0.70 gm./cc., and surface area characteristics such that the average pore diameter is about 20 to about 300 angstroms, the pore volume is about 0.10 to about 1.0 ml./gm., and the surface area is about 100 to about 500 m.$^2$/gm.

The support may be prepared in any suitable manner and, may be activated prior to use by one or more treatments including drying, calcination, steaming, etc. When gamma-alumina is used, it may be in a form known as activated alumina of commerce, activated alumina, porous alumina, alumina gel, etc. Since the precise method of preparing the carrier material is not essential to my invention, whether it be amorphous or zeolitic, further discussion is not believed necessary to a clear understanding of the present process. An illustrative example of one suitable method of preparation is, however, hereinafter set forth. The carrier material may be formed in any desired shape such as spheres, pills, cakes, extrudates, powders, granules, etc. A particularly preferred form is the sphere; spheres may be continuously manufactured by the well-known oil drop method which comprises forming an alumina hydrosol by any of the techniques taught in the art, combining the hydrosol with a suitable gelling agent and dropping the resultant mixture into an oil bath maintained at elevated temperatures. Further details of spherical alumina production may be found in U.S. Pat. No. 2,620,314.

One constituent of the catalyst for use in the present invention is a chlorine component. Although the precise form of the chemistry of the association of the chlorine component with the support is not entirely known, it is customary in the art to refer to the chlorine component as being combined with the carrier material, or with the other ingredients of the catalyst. Prior art catalysts of this nature consider the various members of the halogen family to be substantially equivalent, although fluorine and/or chlorine are indicated as being preferred. Such is not the case where the process involves the ring-opening of cyclic hydrocarbons. The chlorine may be added to the support in any suitable manner, either during preparation of the support, or before or after the addition of the catalytically active metallic components. For example, the chlorine may be added at any stage of the preparation of the support, or to the calcined support, as an aqueous solution of an acid such as hydrogen chloride. In any event, the chlorine will be typically composited with the carrier material in such a manner as to result in a final composite that contains about 0.1% to about 1.5% and preferably about 0.4 to about 0.9% by weight, calculated on an elemental basis.

The preferred catalyst also contains a Group VIII noble metal component. Although the process of the present invention is specifically directed to the use of a catalytic composite containing platinum, it is intended to include other platinum group metals such as palladium, rhodium, osmium, iridium and ruthenium. The noble metal component, such as platinum, may exist within the final catalytic composite as a compound such as an oxide, sulfide, halide, etc., or as an elemental state. The noble metal component generally comprises about 0.01% to about 2.0% by weight of the final catalytic composite calculated on an elemental basis. Excellent results are obtained when the catalyst contains about 0.3 to about 0.9 weight percent of the metal.

This metallic component may be incorporated in the catalytic composite in any suitable manner such as coprecipitation or cogellation with the support, ion-exchange, or impregnation of the support and/or hydrogel at any stage in its preparation either after, or before calcination. The preferred method of preparing the catalyst involves the utilization of a water soluble compound of the metal to impregnate the support. Thus, the metal, for example platinum, may be added to the support by commingling the latter with an aqueous solution of chloroplatinic acid. Other water-soluble compounds of platinum may be employed, and include ammonium chloro-platinate, platinum chloride, dinitro-diamono platinum, etc. The utilization of a platinum chloride compound, such as chloroplatinic acid, is preferred since it facilitates the incorporation of both the platinum component and at least a minor quantity of the chlorine component in a single step. Hydrogen chloride is also generally added to the impregnation solution in order to further facilitate the incorporation of the chlorine component. Following the impregnation, the support is dried and subjected to a high temperature calcination or oxidation technique at about 750° F. to about 1300° F. When a crystalline aluminosilicate is employed as the carrier material, the upper limit for calcination is about 1000° F.

Another essential constituent of the catalyst is a technetium or rhenium component. This component may be present as an elemental metal, as a chemical compound, such as the oxide, sulfide, halide, or in a physical or chemical association with the carrier material and/or the other components of the catalyst. Generally, this component is utilized in an amount sufficient to result in a final catalytic composite containing about 0.01% to about 2.0% by weight, calculated as an elemental metal. The component may be incorporated in the catalytic composite in any suitable manner and at any stage in the preparation. As a general rule, it is advisable to introduce the component at a later step of the preparation in order that the expensive metal will not be lost due to subsequent processing involing washing and purification treatments. The preferred procedure for incorporating, for example the rhenium component, involves the impregnation of the support either before, during or after the other components referred to above are added. The impregnation solution can in some cases be an aqueous solution of a suitable rhenium salt such as ammonium perrhenate. In addition, aqueous solutions of rhenium halides, such as the chloride, may be used if desired; however, the preferred impregnation solution is an aqueous solution of perrhenic acid. In general, the rhenium component can be impregnated either prior to, simultaneously with, or after the platinum group metallic component is added to the support.

Regardless of the details of how the components of the catalyst are composited with the support, the final catalyst generally will be dried at a temperature of from about 200° F. to about 600° F. for a period of from about 2 to about 24 hours or more and finally calcined at a temperature of about 750° F. to about 1300° F. for a period of about 0.5 to 10 hours, and preferably about 1 to about 5 hours.

An essential feature of my invention is the prereduction of the catalyst, in a substantially water-free environment, prior to its use in the ring-opening hydrogenation of cyclic hydrocarbons. This technique is designed to result in a two-fold effect. Initially, there is insured a uniform and finely-divided dispersion of the metallic components throughout the carrier material. The reactions of ring-opening and hydrogenation are highly exothermic in nature. Therefore, there exists the tendency, at the outset of the process, to experience a temperature run-away whereby excessive quantities of carbon are initially deposited on the catalytic composite. Such coke deposition is accompanied by the overabundant production of normally gaseous paraffins.

Preferably, substantially pure and dry hydrogen—i.e. containing less than 30.0 volume p.p.m. of water—is used as the reducing agent. The reducing agent contacts the calcined catalyst with all intended components present, at a temperature of about 800° F. to about 1200° F., and for a period of about 0.5 to 10 hours, or more, and effective to substantially reduce both metallic components to their elemental state. This reduction treatment may be performed in situ as part of a start-up sequence if precautions are taken to pre-dry the unit to a substantially water-free state, and if substantially water-free hydrogen is used. As hereinafter set forth, the pre-reduction results in a catalytic composite having an unusual degree of activity and stability with respect to the ring-opening of cyclic hydrocarbons, to the exclusion of excessive hydrocracking which yields large quantities of normally gaseous hydrocarbons.

From the foregoing, it is seen that the process of the present invention utilizes a catalytic composite of a Group VII-B metal component, a noble metal component, an inorganic oxide carrier material and a chlorine component. It is recognized that the proior art is replete with descriptions of a multitude of such catalysts, and further that the halogen may be selected from a group of fluorine, chlorine, bromine and iodine. The prior art acknowledges that the utilization of halogen, in some combined form, with the other components of the catalytic composite, imparts a particular acid-acting function to the catalyst, whereby the same exhibits the tendency to promote hydrocracking. For the most part, the various members of the halogen family are treated as being equivalent for this purpose, and it is further acknowledged that fluorine, chlorine and mixtures thereof may be employed with substantially equal success. To the contrary, the various members of the halogen family are not equivalent for the purpose of effecting the ring-opening of cyclic hydrocarbons; there appears to be a certain degree of criticality attached to the concentration of combined halogen within the catalyst and, the particular halogen employed to effect this reaction is important. As hereinafter indicated, fluorine, for example, is not equivalent to chlorine, a mixture of chlorine and fluorine is not equivalent to chlorine, and the use of chlorine alone produces a catalytic composite having an unusual degree of activity and stability with respect to the ring-opening of cyclic hydrocarbons. The catalyst employed in the present process appears to be extremely selective in converting the cyclic hydrocarbons into paraffinic hydrocarbons, the latter being essential to the production of an acceptable jet fuel hydrocarbon fraction.

Although the precise effect of the particular calcination/reduction drying procedure is not accurately known, it is believed that the greater proportion of the chlorine component is caused to combine with the carrier and platinum-group metallic component in such a manner that it is not easily removed from the catalyst during processing.

As is well known to those skilled in the art, the initial selection of the operating temperature is made primarily as a function of the desired product, while considering the characteristics of the charge stock and the catalyst. The temperature is thereafter increased during the operation to compensate for the inevitable deactivation that occurs. It is an advantage of the present invention that the rate at which the temperature is increased is substantially lower for the catalyst used in the process. Moreover, the paraffinic hydrocarbon yield loss for given temperature increase is substantially lower than for a catalyst of the prior art.

Another advantageous feature resides in the fact that, for the same severity level, operations may be conducted at higher LHSV than normally can be achieved with a catalyst of the prior art. This unexpected property is primarily a consequence of the unusual response of the catalyst to temperature variation. The catalyst used in the process of the present invention does not appear to respond to higher temperatures in the expected fashion, and the amount of hydrocracking to lower-boiling products, experienced at the same temperature, is significantly lower. Accordingly, the process affords the achievement of a given severity level by operating at a higher temperature and a higher LHSV than heretofore has been possible. This last feature is of economic significance because it allows a continuous process to operate at the same throughput level with less catalyst inventory than that heretofore used with conventional catalyst at no sacrifice in catalyst life.

The process of the present invention may be effected in any suitable equipment, and it is particularly preferred to utilize the well-known, fixed-bed system in which the catalyst is disposed in a reaction zone, and the hydrocarbons are passed therethrough in upward flow, downward flow or radial flow. The total reaction zone effluent is passed into a separation zone for the purpose of separating a hydrogen-rich gas stream which is generally recycled to combine with fresh hydrocarbon charge stock. The light paraffinic hydrocarbons, methane, ethane, propane and butane are removed from the normally liquid product effluent in a suitable fractionation or distillation zone. Any unreacted cyclic hydrocarbons, remaining in the liquid product stream, may be removed therefrom and recycle to combine with the original hydrocarbon charge and hydrogen.

The hydrocarbon charge, containing cyclic hydrocarbons, is passed into the reaction zone at a liquid hourly space velocity (defined as volumes of hydrocarbon charge per hour, per volume of catalyst within the reaction zone), of from about 0.5 to about 20.0. As hereinabove set forth, a hydrogen-rich gas stream is recycled to combine with the fresh hydrocarbon charge. The hydrogen will be recycled in an amount sufficient to result in a hydrogen to hydrocarbon molar ratio of from about 4:1 to about 50:1. In view of the comparatively high pressures, at which the process of the present invention is effected, lesser quantities of hydrogen are preferred in order to ease the load placed upon the equipment employed in recycling; thus, it is preferred to employ hydrogen recycle in an amount to yield a hydrogen to hydrocarbon molar ratio within the range of about 6:1 to about 15:1. The reaction zone is maintained under an imposed pressure in excess of about 1,000 p.s.i.g., having an upper limit of about 5,000 p.s.i.g. At pressures below about 1,000 p.s.i.g., the reaction effluent does not contain a sufficient quantity of paraffinic hydrocarbons necessary to meet the luminosity number specification, notwithstanding the fact that there is effected a considerable amount of ring-opening at the lower pressure. The temperature at which the catalyst is maintained must necessarily be controlled within the particular limits in order to avoid a temperature run-away which inherently results in an excessive degree of hydrocracking of the paraffinic hydrocarbons into the light paraffinic gaseous material, methane, ethane, propane and butane. On the other hand, the temperature must be such that sufficient ring-opening is effected to meet, or exceed the specification in regard to luminosity number. It has been found that the catalyst temperature should be maintained within the range of from about 300° C. to about 500° C., at which temperature unusually high volumetric yields of a product possessing the required luminosity number are produced. As hereinbefore stated, for a given feed stock, the operating conditions will be selected and correlated to effect, as the principal reaction, the ring-opening hydrogenation of the cyclic hydrocarbons. The charge stock to the reaction zone may be a straight-run gasoline, thermally or catalytically-cracked gasoline, heavy or light naphtha fraction, or mixtures thereof. Generally, the boiling range of the charge stock will be from about 125° F. to about 430° F., although heart-cut distillates having a boiling range of from about 200° F. to about 350° F., or in some instances up to about 550° F., characteristic of jet fuel fractions, may be employed. Prior to being introduced into the reaction zone, the hydrocarbon charge may be subjected to a suitable separation to remove normal paraffinic hydrocarbons therefrom. The use of molecular sieves is extremely advantageous for this purpose, resulting in a substantially denormalized hydrocarbon fraction.

EXAMPLES

The following examples are given to illustrate the process of the present invention, and to indicate the benefits afforded through the utilization thereof in producing a jet fuel hydrocarbon fraction.

EXAMPLE I

This example is presented to illustrate the inadequacy of a typical hydrocracking/hydrogenation prior art catalyst for utilization in the process of the present invention. The catalyst employed was a nickel-kieselguhr catalyst in the form of ⅛-inch cylindrical pills, having composited therewith about 55.5% by weight of nickel. The reaction zone was maintained at a pressure of 500 pounds per square inch, the liquid hourly space velocity was 2.0, and the hydrogen to hydrocarbon molar ratio was 5:1. The operating temperature varied between the limits of 200° C. and 425° C.; the results of the various operations are given in the following Table I. The charge stock was a denormalized intermediate naphtha having a boiling range of 221° F. to 351° F., and contained, on a volumetric basis, 31% paraffins, 57% naphthenes and 12% aromatics. An initial analysis indicated a luminosity number of 70.

TABLE I.—PRODUCT QUALITY (NICKEL KIESELGUHR CATALYST)

| Period number | 1 | 2 | 3 | 4 | 5 | 6 | 7 |
|---|---|---|---|---|---|---|---|
| Operating conditions: | | | | | | | |
| Pressure, p.s.i.g | 500 | 500 | 500 | 500 | 500 | 520 | 1,000 |
| Temperature, ° C | 200 | 220 | 260 | 310 | 400 | 300 | 300 |
| Product inspection (wt. percent: | | | | | | | |
| Paraffins | 36 | 35 | 37 | 35 | 33 | 41 | 39 |
| Olefins | | | | | | 1 | |
| Napthenes | 64 | 65 | 63 | 65 | 53 | 59 | 61 |
| Aromatics | | | | | 13 | | |
| Luminosity number | 98 | 95 | 99 | 102 | 73 | 99 | 100 |

The seven periods of operation indicated in Table I, illustrate the inadequacy of the nickel-kieselguhr catalyst to produce a jet fuel hydrocarbon fraction of suitable luminosity number, which should not be lower than 132. As indicated in Table I, as the operating temperature exceeded 300° C., very little ring-opening was effected, and, for all practical purposes, the liquid product effluent was identical to the original hydrocarbon charge stock. It is further noted that an increase in pressure to a level of 1000 pounds per square inch did not improve the operation. It is evident that this type catalyst is inapplicable for use in the process of the present invention.

EXAMPLE II

This example illustrates the effect of the operating pressure upon the process of the present invention. The charge stock employed was identical to that of the foregoing Example I, the space velocity was maintained at 1.0 to 1.5 and the hydrogen to hydrocarbon ratio at about 10:1. The periods were conducted at each of three different pressure levels, 500, 900 and 9000 p.s.i.g. At each pressure level, two tests were conducted at different temperature levels; the conditions for the six periods are given in the following Table II.

TABLE II.—PRESSURE EFFECT

| Period number | 8 | 9 | 10 | 11 | 12 | 13 |
|---|---|---|---|---|---|---|
| Operating conditions: | | | | | | |
| Pressure, p.s.i.g | 500 | 500 | 900 | 900 | 2,000 | 2,000 |
| Temperature, ° C | 520 | 370 | 360 | 330 | 325 | 300 |
| Product inspection (wt. percent): | | | | | | |
| Paraffins | 38 | 45 | 65 | 50 | 85 | 69 |
| Olefins | 0 | 0 | 0 | 0 | 0 | 0 |
| Naphthenes | 62 | 48 | 35 | 50 | 15 | 31 |
| Aromatics | 0 | 7 | 0 | 0 | 0 | 0 |
| Luminosity number | 99 | 79 | 111 | 105 | 146 | 124 |

The catalyst employed in obtaining the data illustrated in the foregoing Table II was a composite of alumina, 0.375% by weight of platinum, and 4.0% by weight of combined fluoride, calculated as the element thereof. The effect of increasing the pressure to a level in excess of 1000 pounds per square inch, is readily ascertained from the data presented in Table II. However, analyses performed for the purpose of obtaining the product distribution, indicated that the presence of excess fluoride, above 1.5%, resulted in an excessive degree of hydrocracking such that the weight percent of the pentanes and heavier hydrocarbons product was only 77.2% of the original hydrocarbon charge stock.

EXAMPLE III

This example is given for the purpose of comparing the results obtained through the use of catalytic composites containing varying quantities of platinum and combined halide. The charge stock is a Mid-Continent heavy naphtha containing 56.0% by volume of cyclic compounds, and has a luminosity number of 71; the charge stock indicates a boiling range from 246° F. to 385° F. The reaction zone is maintained at a pressure of 2000 pounds per square inch and a liquid hourly space velocity of 2.0, the hydrogen to hydrocarbon molar ratio is 10:1, the temperature being varied from 280° C. to 390° C., for the purpose of obtaining final products having different luminosity numbers, and to vary the degree of hydrocracking being effected within the reaction zone. One of the catalysts evaluated under these conditions contains 0.75% by weight of platinum and 0.90% by weight of combined chloride, calculated as the element; another catalyst, 0.90% combined chloride and 1.50% by weight of rhenium.

For each of the catalysts tested, graphical plots are made of the quantity of cyclic hydrocarbons in the product effluent, the luminosity number and the quantity of light paraffinic hydrocarbons product, with temperature as the variable. As indicated in Table III, the catalysts are compared at low levels of hydrocracking, first at a level of 75 standard cubic feet of light paraffinic hydrocarbons per barrel of fresh charge, and secondly, at a hydrocracking level of 220 standard cubic feet.

TABLE III.—CATALYST EVALUATION

| Catalyst | @ 75 s.c.f./bbl. | | @ 220 s.c.f./bbl. | |
|---|---|---|---|---|
| | Cyclic | Luminosity | Cyclic | Luminosity |
| 0.375% Pt., 4.0% F | 42 | 107 | 28 | 123 |
| 0.750% Pt., 0.25% Li | 40 | 112 | 29 | 199 |
| 0.375% Pt | 37 | 121 | | |
| 0.750% Pt., 0.22% Cl | 33 | 126 | 16 | 138 |
| 0.750% Pt., 0.90% Cl | 23 | 140 | 7 | 151 |
| 0.750% Pt., 0.90% F | 28 | 133 | 12 | 145 |
| 1.50% Re., 0.90% Cl | 20 | 145 | 6 | 154 |

EXAMPLE IV

This example is given for the purpose of comparing the results obtained through the use of a reduced catalytic composite and one which is not pre-reduced prior to use. The charge stock is a heavy naphtha which is first hydrogenated, containing 58.0 volume percent naphthenes and 42.0 volume percent paraffins, the luminosity number being 100; the charge stock has a boiling range from 245° F. to 369° F. The reaction zone is maintained at a pressure of 2000 p.s.i.g., and a liquid hourly space velocity of 1.0; the hydrogen to hydrocarbon molar ratio is 10:1, the temperature being varied from 280° C. to 390° C. Both of the catalysts evaluated under these conditions contain 0.375% by weight of platinum, 0.375% by weight of rhenium and 0.90% by weight of combined chloride, calculated as the elements.

One portion of the catalyst is subjected to a final reduction-drying technique at 550° C. (1022° F.), at substantially atmospheric pressure, and with 5.0 s.c.f./hr. of hydrogen for a period of five hours. This pre-reduced catalyst is designated as catalyst "A" in the tabulation hereinafter presented. A second portion of the catalyst is placed in a ⅞-inch (nominal I.D.) reactor, in an amount of 100 cc., and hydrogen circulated at a rate of 5.5 s.c.f./hr., in admixture with the charge stock, introduced at a temperature of 280° C. (536° F.); this catalyst is designated as catalyst "B." A total of seven operations are conducted, and at the temperature levels indicated in the following Table IV.

TABLE IV.—PRE-REDUCTION EFFECT

| | Catalyst Designation | |
|---|---|---|
| | A | B |
| | Luminosity numbers | |
| Temperature, ° C.: | | |
| 280 | 105 | 106 |
| 300 | 111 | |
| 320 | 117 | 103 |
| 340 | 133 | |
| 350 | 146 | 106 |
| 360 | 155 | |
| 370 | 163 | 114 |

The corresponding concentrations of cyclic hydrocarbons are presented in the following Table V:

TABLE V.—CYCLIC HYDROCARBON CONCENTRATION

| | Catalyst designation | |
|---|---|---|
| | A | B |
| | Volume percent cyclics | |
| Temperature, ° C.: | | |
| 280 | 51 | 52 |
| 300 | 45 | |
| 320 | 41 | 53 |
| 340 | 29 | |
| 350 | 23 | 52 |
| 360 | 15 | |
| 370 | 8 | 42 |

EXAMPLE V

A catalyst is prepared utilizing a crystalline aluminosilicate carrier material of about 20.0% faujasite dispersed in an alumina matrix. The carrier is impregnated with a solution of hydrochloric acid, perrhenic acid and chloroplatinic acid. The composite is evaporated to dryness, and further dried at 300° F., a calcination treatment is effected at 900° F., for a period of about 10 hours, in an atmosphere of air. Traces of oxygen are removed by means of a "nitrogen sweep" as the temperature is increased to 1025° F. Hydrogen is circulated at the higher temperature, for a period of six hours at a rate of about 7.5 s.c.f./hr. The temperature is reduced to a level of 350° C., and the heavy naphtha charge stock is introduced after the pressure is increased to 2,000 p.s.i.g.; the liquid hourly space velocity is 1.5. Following a line-out period of about ten hours, an eight-hour test is conducted, the product from which is analyzed for cyclic content and luminosity number. The luminosity number is 164, and the cyclic content about 6.5 volume percent, which results compare very favorably with those indicated in Tables IV and V with respect to catalyst "A" at 370° C. and 1.0 liquid hourly space velocity.

The foregoing specification and examples illustrate the process of the present invention as conducted for the production of paraffinic jet fuel components.

I claim as my invention:

1. A process for the production of a normal paraffinic hydrocarbon which comprises contacting a cyclic hydrocarbon boiling in the range of about 125° F. to about 550° F. and hydrogen at reaction conditions including a temperature of from about 300° C. to about 500° C. and a pressure of from about 1000 to about 5000 p.s.i.g., with a reduced catalytic composite containing a Group VII–B metal component, having an atomic number greater than 25, and combined chlorine, correlating said reaction conditions to effect the ring-opening and hydrogenation of the cyclic hydrocarbon without substantial hydrocracking, and separating a normally liquid straight-chain paraffin from the resultant reaction products.

2. The process of claim 1 further characterized in that said group VII–B metal component is rhenium.

3. The process of claim 1 further characterized in that said cyclic hydrocarbon is a cycloparaffin.

4. The process of claim 1 further characterized in that said cyclic hydrocarbon is an aromatic.

5. The process of claim 1 further characterized in that said catalytic composite also contains a Group VIII noble metal component.

6. The process of claim 1 further characterized in that said catalytic composite comprises a platinum component.

7. The process of claim 1 further characterized in that said catalytic composite comprises a palladium component.

8. The process of claim 1 further characterized in that said catalytic composite comprises a porous carrier material.

9. The process of claim 8 further characterized in that said porous carrier material is a crystalline aluminosilicate.

References Cited

UNITED STATES PATENTS 3,410,787  11/1968  Kubicek _____ 208—57
3,422,001  1/1969  Kouwenhoven et al. __ 208—143

DELBERT E. GANTZ, Primary Examiner

G. E. SCHMITKONS, Assistant Examiner

U.S. Cl. X.R.

208—DIG 2; 252—441